United States Patent [19]

Zelina

[11] Patent Number: 5,053,636
[45] Date of Patent: Oct. 1, 1991

[54] OVERRIDE CIRCUIT FOR MEDICAL TABLE

[75] Inventor: Francis J. Zelina, Lake City, Pa.

[73] Assignee: American Sterilizer Company, Erie, Pa.

[21] Appl. No.: 195,556

[22] Filed: May 18, 1988

[51] Int. Cl.⁵ .................... H02B 1/24; A61G 13/00
[52] U.S. Cl. ................................ 307/112; 269/325
[58] Field of Search ............... 307/112; 318/749, 480, 318/467, 103, 65; 269/322, 325, 324, 323; 297/71, 330

[56] References Cited

U.S. PATENT DOCUMENTS

| | | | |
|---|---|---|---|
| 3,578,379 | 5/1971 | Taylor et al. | 297/71 |
| 3,913,153 | 10/1975 | Adams et al. | 318/65 |
| 3,921,048 | 11/1975 | Padgitt | 318/480 |
| 4,044,286 | 8/1977 | Adams et al. | 318/103 X |

FOREIGN PATENT DOCUMENTS 2554059  6/1977  Fed. Rep. of Germany.
2746630  4/1979  Fed. Rep. of Germany.
2159976  6/1973  France.

Primary Examiner—A. D. Pellinen
Assistant Examiner—Sharon D. Logan
Attorney, Agent, or Firm—Kirkpatrick & Lockhart

[57] ABSTRACT

A medical table having an override circuit includes control circuits for generating control signals in response to user input. Switches are provided for generating control signals in response to user input. Mechanical actuators, responsive to the control signals, move the medical table. An override circuit electrically isolates the control circuits from the mechanical actuators in response to the generation of control signals by the switches.

9 Claims, 3 Drawing Sheets

OVERRIDE CIRCUIT FOR MEDICAL TABLE

BACKGROUND OF THE INVENTION

1. Field of the Invention

The present invention is directed generally to medical tables and more particularly to the control circuitry for such tables.

Tables, such as surgical, tables can be oriented in a variety of positions. For example, a surgical table may be oriented in a Trendelenberg (head down, feet up), reverse Trendelenberg (head up, feet down), flex (head down, midsection up, feet down) and reflex (head up, midsection down, feet up) positions. In addition to those positions, it is desirable to be able to raise and lower the patient's legs, raise and lower the patient's back, tilt the table to the left or right, and to raise and lower the entire table. In addition, some tables are equipped with floor locks which must be locked before various functions can be performed. To provide a table capable of assuming all those positions and performing all of those functions while maintaining the table within acceptable size and weight constraints several manufacturers have turned to the use of microprocessors. An appropriately programmed microprocessor can handle all of the functions which the table is required to perform while eliminating bulky relays and switches.

One problem which has been encountered in adapting medical tables to microprocessor control is electromagnetic interference. In the environment of an operating room, dozens of pieces of electrical equipment, from lighting to monitors, are crammed into a small area. It has been discovered that electromagnetic interference generated by certain of such equipment causes the microprocessors used in surgical tables to malfunction, which is an unacceptable situation. Therefore, the need exists for control circuitry which provides the surgeon with the ability to override the normal microprocessor controls in a surgical table in the event of microprocessor malfunction.

SUMMARY OF THE PRESENT INVENTION

The present invention is directed to a medical table having an override circuit. The table includes control circuits for generating control signals in response to user input. A plurality of switches is provided for generating control signals in response to user input. Means are provided for moving the medical table in response to the control signals. An override circuit electrically isolates the control circuits from the means for moving the table in response to the generation of control signals by the plurality of switches.

According to one embodiment of the present invention, a power supply is provided for supplying power to the control circuits. The override circuit electrically isolates the control circuits from the power supply in response to the generation of control signals by the plurality of switches.

According to another embodiment of the present invention, whenever one of the plurality of switches is operated to generate a control signal, the override circuit prevents the remaining switches from being operated to generate control signals.

The present invention is also directed to a method of controlling a medical table in the event the control circuits of the table malfunction. The method includes the steps of manually generating control signals through the operation of a plurality of switches for controlling the operation of the medical table, and electrically isolating the control circuits in response to the manual generation of control signals.

The present invention thus provides an apparatus and a method for enabling a medical table to be controlled despite the failure of its normal control circuitry. The override circuit of the present invention additionally isolates the control circuits from a power supply as well as the means for moving the table in the event of control circuit malfunction. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DESCRIPTION OF A PREFERRED EMBODIMENT

The override circuit of the present invention will be described in the environment of a surgical table 10 represented by the dashed box in FIG. 1. It should be understood that the concepts of the present invention are equally applicable to other types of medical tables.

Figure 1:
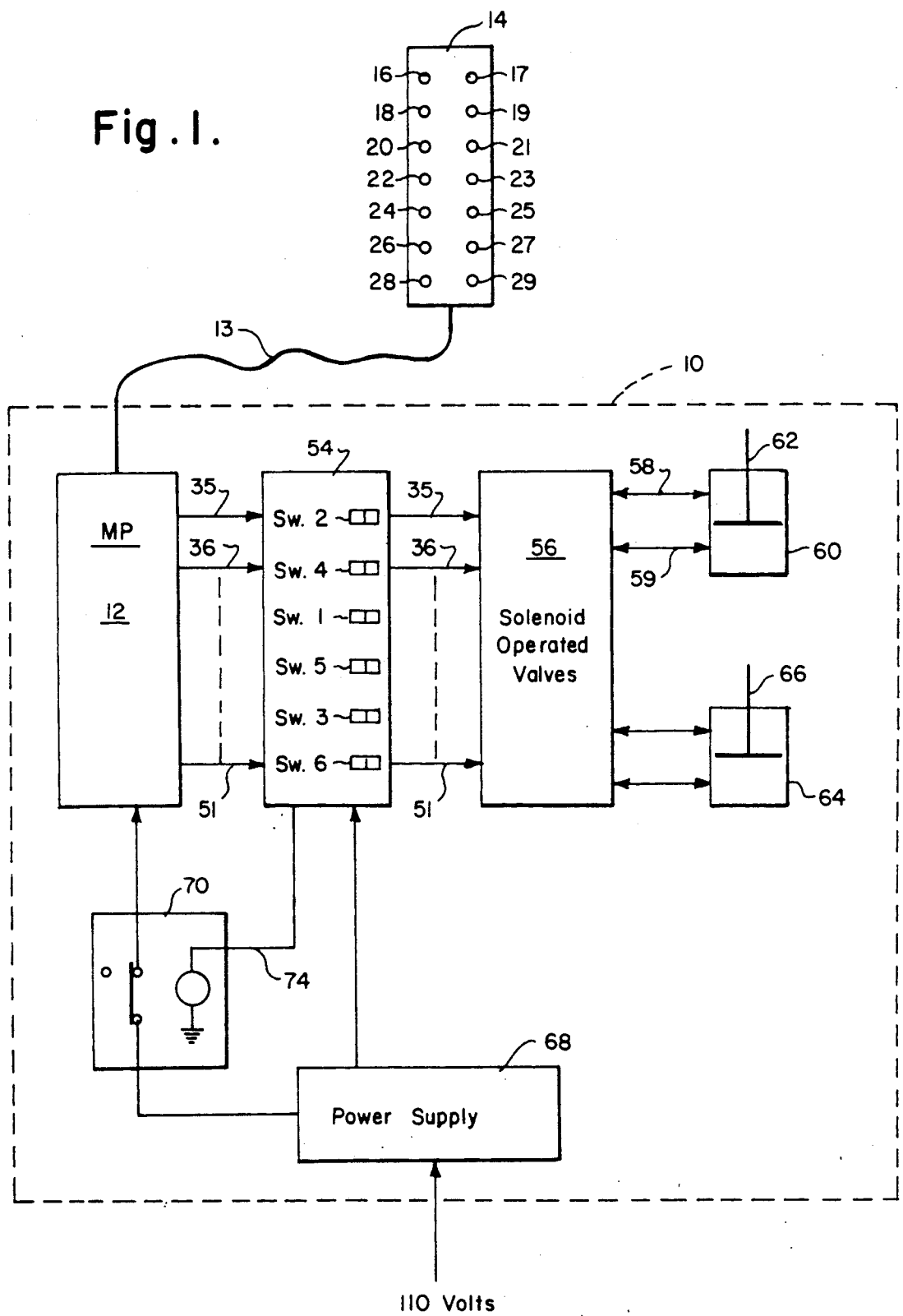
FIG. 1 is a block diagram illustrating the major components of a medical table including the override circuit of the present invention.

In FIG. 1, the surgical table 10 is controlled by a microprocessor 12. The microprocessor 12 receives signals through a cable 13 from a hand control unit 14. The hand control unit 14 carries a plurality of switches which are activated by the user to cause the surgical table 10 to assume a desired position or condition. For example, the hand control unit 14 may carry switches 16 through 29 which cause the table 10 to assume, respectively, the following conditions and positions: lock, unlock, Trendelenberg, reverse Trendelenberg, raise table, lower table, left tilt, right tilt, raise back, lower back, raise leg, lower leg, flex, and reflex.

Figure 2A:
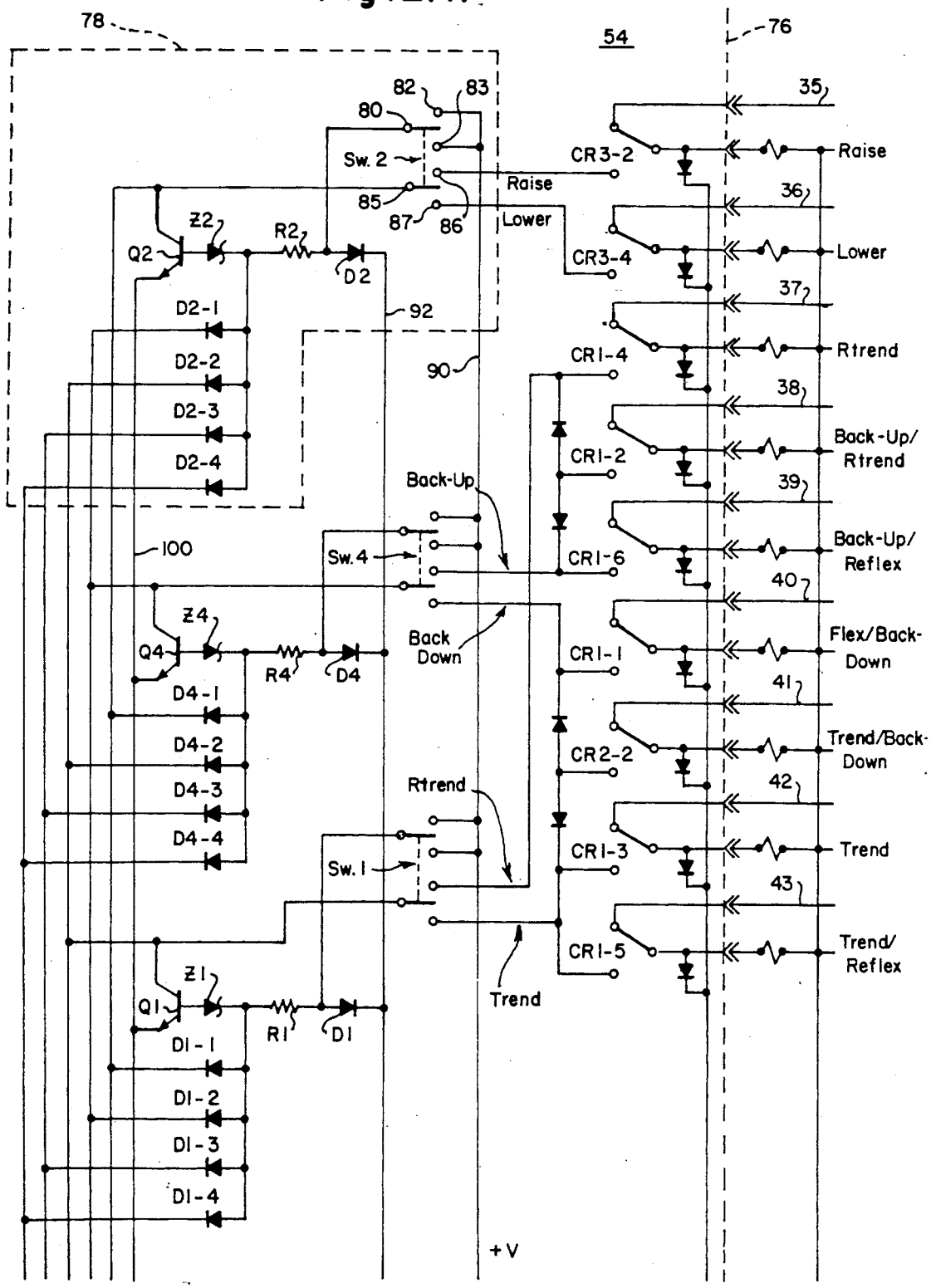
FIGS. 2A and 2B are an electrical schematic of an override circuit constructed according to the teachings of the present invention.
Figure 2B:
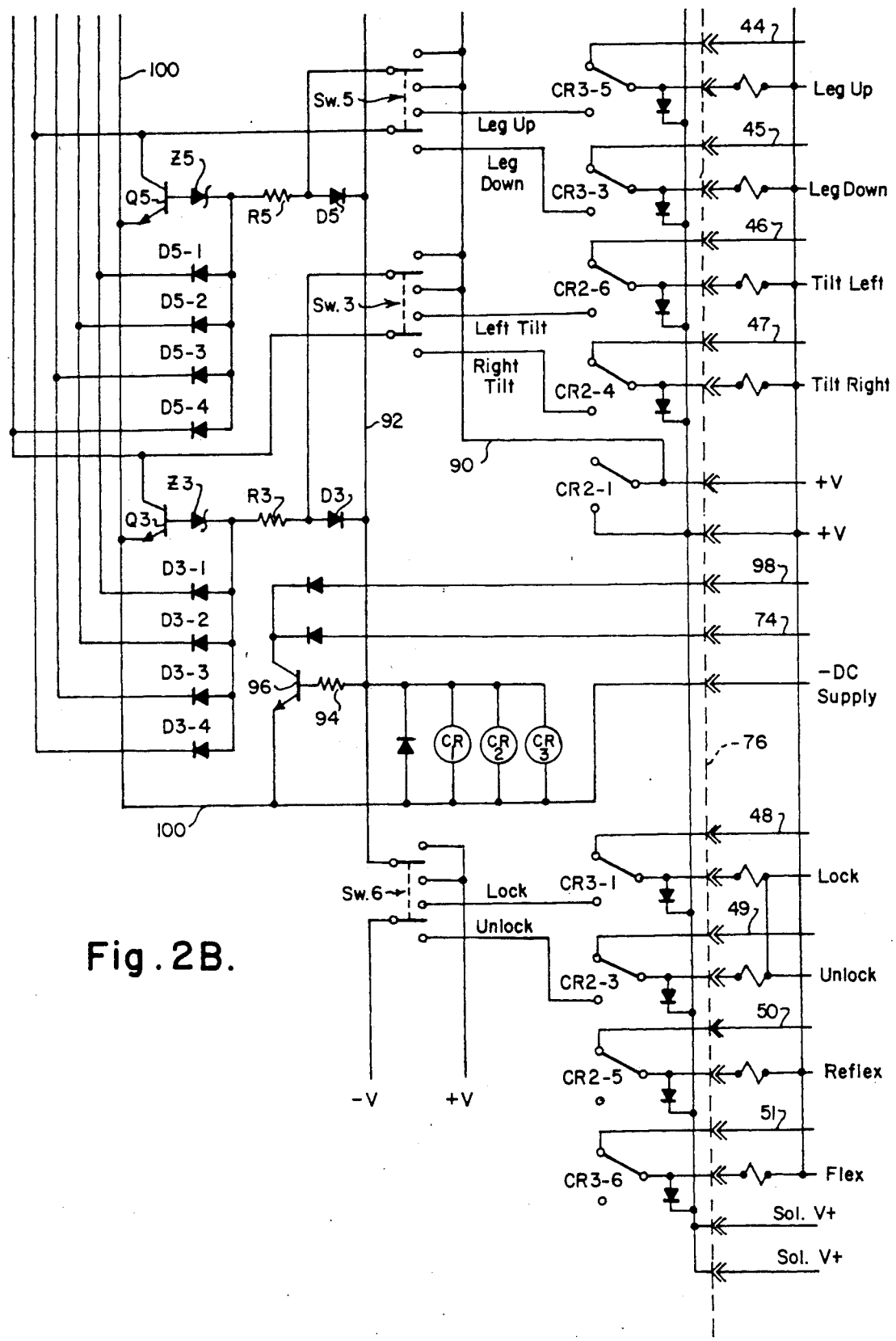

The microprocessor 12 outputs, through an appropriate interface device (not shown), signals available on output lines 35 through 51, seen in FIGS. 2A and 2B, in response to the activation of switches on the control unit 14. Under normal operating conditions, the signals on lines 35 through 51 pass through an override circuit 54 and energize the solenoid of one or more solenoid operated valves as represented by box 56 in FIG. 1. In a known manner, the solenoid operated valves are arranged to provide hydraulic fluid through lines 58 and 59 to a hydraulic cylinder 60. Fluid flow into and out of the hydraulic cylinder 60 causes a piston 62 of the hydraulic cylinder 60 to move in a known manner. The piston is connected to a portion of the table 10 (not shown) to effect movement thereof. A second hydraulic cylinder 64 having a piston 66 is also shown in FIG. 1. However, the reader should recognize that numerous hydraulic cylinders may be required so that the surgical table 10 can perform all of the desired functions. The interconnection of solenoid operated valves to control hydraulic cylinders to cause a table to assume various positions is known as is disclosed in U.S. patent application Ser. No. 124,238, filed Nov. 23, 1987, which is assigned to the same assignee as the present invention.

Completing the description of FIG. 1, a power supply 68 is provided which may receive, for example, line voltage and produce therefrom suitable voltages for operating the circuitry of the surgical table 10. A voltage provided by the power supply 68 is input to the microprocessor 12 through a relay 70. A voltage produced by the power supply 68 is input to the override circuit 54. The override circuit, through a line 74, controls the operation of the relay 70.

As previously mentioned, during normal operation the signals available on lines 35 through 51 pass through the override circuit 54 to operate the solenoid operated valves 56 to cause the table 10 to assume the condition or position selected by the user. However, in the event of a microprocessor 12 malfunction, or a malfunction of the hand control unit 14, the table 10 can be operated by manipulation of switches SW1 through SW6 located within the override circuit 54. In addition to controlling the operation of the table, whenever any of the switches SW1 through SW6 is activated, the override circuit 54 provides the following functions:

1. the lines 35 through 51 are opened thereby isolating the microprocessor 12 from the solenoid operated valves 56;
2. a signal is output on line 74 to operate the relay 70 so that the microprocessor 12 is disconnected from the power supply 68; and
3. whichever switch of the override circuit is being used, the remaining switches are locked out so that the user cannot operate the table in an inappropriate manner. Those functions are discussed more fully in conjunction with FIGS. 2A and 2B.

In FIGS. 2A and 2B the override circuit 54 is illustrated to the left of a dashed line 76. To the right of the dashed line 76 each of the lines 35 through 51 is shown entering and exiting the override circuit 54. Upon exiting the override circuit 54, the line is labeled with the function which it controls. Thus, the lines 35 through 51 control, respectively, the following functions; table raise, table lower, reverse Trendelenberg, back-up (reverse Trendelenberg), back-up (reflex), flex (back down), Trendelenberg (back down), Trendelenberg, Trendelenberg/reflex, leg up, leg down, tilt left, tilt right, floor lock, floor unlock, reflex, and flex.

The override circuit 54 includes three relays CR1, CR2, and CR3 illustrated in FIG. 2B. Each of those relays has associated with it a plurality of contacts. Each of the lines 35 through 51 is connected to a pair of contacts which is controlled by one of the relays CR1, CR2, or CR3. For example, line 35 is connected across a pair of contacts designated CR32. Similarly, lines 36 through 51 are connected, respectively, across the following contacts: CR3-4, CR1-4, CR1-2, CR1-6, CR1-1, CR2-2, CR1-3, CR1-5, CR3-5, CR3-3, CR2-6, CR2-4, CR3-1, CR2-3, CR2-5, and CR3-6.

The switches SW1 through SW6 are shown running through the center of FIGS. 2A and 2B. Each of the switches may be a momentary toggle switch which must be held closed until the desired table position is achieved. The circuitry associated with switch SW2 is shown within a dashed box 78. The reader should understand that the switches SW4, SW1, SW5, and SW3 all have the same type of circuitry associated therewith as shown in box 78.

When the switch SW2 is operated to bring contacts 80 and 82 into electrical communication, a positive voltage available on a line 90 is made available at a junction between a resister R2 and a diode D2. Current is then conducted through the diode D2, through a line 92 and a resister 94 (seen in FIG. 2B) to a base terminal of a transistor 96. The transistor 96 acts as a switch for turning on a pump motor drive transistor (not shown) which provides hydraulic pressure for operating the hydraulic cylinders. That is accomplished through a pump line 98. In addition, the transistor 96 acts as a switch which allows the line 74 to carry current. With the line 74 carrying current, the contacts of relay 70 change state thereby isolating the microprocessor 12 from the power supply 68. Thus, when any of the switches SW1 through SW6 is activated, the transistor 96 becomes conductive turning the pump motor on and isolating the microprocessor 12 from the power supply 68.

When current is conducted by line 92, in addition to rendering the transistor 96 conductive, all of the relays CR1, CR2, and CR3 are energized thereby causing all of their contacts to change state. When that occurs, each of the lines 35 through 51 is isolated from the microprocessor 12. For example, the line labeled RAISE is no longer connected through the line 35 to the microprocessor 12 but rather is connected to a contact 86 of the switch SW2. The contact 86 of the switch SW2 is in electrical communication with a contact 85 when switch SW2 is operated so as to provide the RAISE function. With the junction between the resister R2 and the diode D2 energized, a transistor Q2 is turned on. With the transistor Q2 on, the contact 85 is pulled low by virtue of a line 100 connected through transistor Q2 to a negative voltage source. With the contact 85 low, the RAISE line sees a current sink such that the RAISE function is enabled.

Additionally, with the contact 85 low, a base terminal of a transistor Q4 is pulled low through a diode D4-1, a base terminal of a transistor Q1 is pulled low through a diode D1-1, a base terminal of a transistor Q5 is pulled low through a diode D5-1, and a base terminal of a transistor Q3 is pulled low through a diode D3-1. In this manner the switches SW4, SW1, SW5, and SW3, respectively, are disabled so that no other function can be performed so long as switch SW2 is being operated.

When switch SW2 is operated to provide the table LOWER function, a contact 83 of the switch SW2 is brought into electrical communication with contact 80 thereby turning the transistors 96 and Q2 on and energizing relays CR1, CR2, and CR3. With transistor 96 conductive, the pump motor is turned on and a signal on line 74 operates relay 70. A contact 87 of the switch SW2 is brought into electrical communication with the contact 85 which has been pulled low by virtue of transistor Q2 being rendered conductive. Thus, the line labeled LOWER sees a current sink such that the table LOWER function is enabled. Again, the remainder of the switches SW4, SW1, SW5, and SW3 are rendered inoperative while the table LOWER function is being performed.

The switches SW4, SW1, SW5 and SW3 operate in a similar manner to provide their respective functions.

The operation of switch SW6 is slightly different. Because switch SW6 operates the floor lock, it is not necessary to lock out the other switches when switch SW6 is being operated. However, it is still necessary when switch SW6 is operated to render the transistor 96 conductive and to energize relays CR1, CR2, and CR3 as shown in FIG. 2B. Switch SW6 need not be physically located with the other switches.

As is apparent from the foregoing description of the override circuit shown in FIGS. 2A and 2B, the override circuit provides several functions in addition to enabling the table to be controlled when the microprocessor 12 or hand control unit 14 fails. In addition to allowing the table to be controlled by switches SW1 through SW6, the override circuit 54 isolates the microprocessor 12 from the solenoid operated valves 56 and from the power supply 68. Additionally, when one of the switches SW1 through SW5 is being operated, the override circuit 54 prevents any of the other switches from being simultaneously operated. That prevents the user from attempting to position the table in an inappropriate manner.

While the present invention has been described in conjunction with an exemplary embodiment thereof, it will be understood that many modifications and variations will be readily apparent to those of ordinary skill in the art. This disclosure and the following claims are intended to cover all such modifications and variations.

What is claimed is:

1. An override circuit for a medical table, said medical table carrying
   control means for generating first control signals in response to user input; and
   means for moving the medical table in response to said first control signals; said override circuit comprising:
   switch means for generating second control signals in response to user input; and
   circuit means for selectively electrically isolating said first control signals from said means for moving the table and for inputting said second control signals to said means for moving.

2. The override circuit of claim 1 wherein the table additionally comprises power supply means for supplying power to said control means, and wherein said circuit means selectively electrically isolates said control means from said power supply means.

3. The override circuit of claim 1 wherein said switch means includes a plurality of momentary switches.

4. The override circuit of claim 3 wherein said circuit means is constructed to inhibit the remaining momentary switches from generating second control signals when one of said momentary switches generates a second control signal.

5. The override circuit of claim 1 wherein said circuit means selectively isolates said first control signal in response to the generation of said second control signals by said switch means.

6. An override circuit for a medical table, said medical table carrying:
   control means for generating first control signals in response to user input; and
   means for moving the medical table in response to said first control signals; said override circuit comprising:
   switch means for generating second control signals in response to user input wherein said switch means includes a plurality of momentary switches; and
   circuit means for electrically isolating said control means from said means for moving the table in response to the generation of said second control signals by said switch means and wherein when one of said momentary switches generates said second control signals, said circuit means prevents the remaining momentary switches from generating additional second control signals, said means for moving being responsive to said second control signals.

7. A method of controlling a medical table, said medical table carrying a first control circuit for producing first control signals for moving the medical table, when the first control circuit fails, said method comprising the steps of:
   manually generating second control signals by operating a plurality of switches for moving the medical table; and
   selectively electrically isolating the first control signals of the failed first control circuit.

8. THe method of claim 7 further comprising the step of selectively electrically isolating said first control circuit from a power supply.

9. An override circuit for moving a medical table, said medical table carrying:
   control means for generating first control signals in response to user input; and
   means for moving the medical table in response to said first control signals; said override circuit comprising:
   switch means for generating second control signals in response to user input;
   circuit means for electrically isolating said control means from said means for moving the table in response to the generation of said second control signals by said switch means and for maintaining electrical isolation after said second control signals cease to be generated.

* * * * *

UNITED STATES PATENT AND TRADEMARK OFFICE
CERTIFICATE OF CORRECTION

PATENT NO. : 5,053,636
DATED : October 1, 1991
INVENTOR(S) : Francis J. Zelina

It is certified that error appears in the above-identified patent and that said Letters Patent is hereby corrected as shown below:

Col 3, line 54, delete "CR32" and substitute --CR3-2-- therefor.

Col. 6, line 33, delete "THe" and substitute --The-- therefor.

Signed and Sealed this

Twelfth Day of July, 1994

Attest:

BRUCE LEHMAN

*Attesting Officer*     *Commissioner of Patents and Trademarks*